United States Patent
Lee et al.

(10) Patent No.: US 11,171,504 B2
(45) Date of Patent: Nov. 9, 2021

(54) CHARGING SYSTEM USING MOTOR DRIVING SYSTEM

(71) Applicants: Hyundai Motor Company, Seoul (KR); Kia Motors Corporation, Seoul (KR)

(72) Inventors: Yong Jae Lee, Hwaseong-si (KR); Joo Young Park, Yongin-si (KR); Jae Ho Hwang, Daejeon (KR); Mu Shin Kwak, Hwaseong-si (KR); Su Hyun Bae, Daegu (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 295 days.

(21) Appl. No.: 16/435,922

(22) Filed: Jun. 10, 2019

(65) Prior Publication Data

US 2020/0177014 A1 Jun. 4, 2020

(30) Foreign Application Priority Data

Dec. 4, 2018 (KR) .................. 10-2018-0154797

(51) Int. Cl.
| | |
|---|---|
| *H02J 7/16* | (2006.01) |
| *H02J 7/04* | (2006.01) |
| *H02P 27/06* | (2006.01) |
| *B60L 53/22* | (2019.01) |
| *B60L 58/13* | (2019.01) |

(52) U.S. Cl.
CPC ............... *H02J 7/16* (2013.01); *B60L 53/22* (2019.02); *B60L 58/13* (2019.02); *H02J 7/04* (2013.01); *H02P 27/06* (2013.01); *B60L 2210/42* (2013.01)

(58) Field of Classification Search
CPC . H02J 7/16; H02J 7/04; B60L 2210/42; B60L 58/13; B60L 53/22; H02P 27/06
USPC ....................................................... 320/137
See application file for complete search history.

(56) References Cited

U.S. PATENT DOCUMENTS

| | | | | |
|---|---|---|---|---|
| 5,099,186 | A * | 3/1992 | Rippel et al. ........... | B60L 3/003 318/803 |
| 7,265,455 | B2 * | 9/2007 | Oyobe et al. ..... | B60W 30/1886 290/1 R |
| 7,362,597 | B2 * | 4/2008 | Ishikawa et al. ....... | B60L 50/61 363/71 |

(Continued)

FOREIGN PATENT DOCUMENTS

KR 10-2012-0047100 A 5/2012

*Primary Examiner* — Sun J Lin
(74) *Attorney, Agent, or Firm* — Morgan, Lewis & Bockius LLP

(57) ABSTRACT

A charging system using a motor driving system, the motor driving system including: a battery and an inverter, the inverter configured to receive and convert a direct current (DC) power stored in the battery into a three-phase alternating current (AC) power and to output the three-phase AC power to a motor when the motor is driven and the motor configured to generate a rotation force using the three-phase AC power output from the inverter, the charging system includes a controller configured to control the inverter to boost a voltage at a neutral point of the motor and to output the boosted voltage to the battery by determining duty values of switching elements in the inverter when an external charging current is provided to the neutral point of the motor.

9 Claims, 5 Drawing Sheets

(56) References Cited

U.S. PATENT DOCUMENTS

| | | | |
|---|---|---|---|
| 7,486,035 B2* | 2/2009 | Oyobe et al. | B60L 53/24 318/149 |
| 7,819,213 B2* | 10/2010 | Oyobe et al. | B60L 50/61 180/65.27 |
| 8,054,013 B2* | 11/2011 | Oyobe et al. | B60L 53/22 318/139 |
| 2020/0189409 A1* | 6/2020 | Lee et al. | H02J 7/0029 |
| 2020/0361323 A1* | 11/2020 | Chon et al. | H02J 7/16 |

* cited by examiner

CHARGING SYSTEM USING MOTOR DRIVING SYSTEM

CROSS REFERENCE TO RELATED APPLICATION

The present application claims priority to Korean Patent Application No. 10-2018-0154797 filed on Dec. 4, 2018, the entire contents of which is incorporated herein for all purposes by this reference.

BACKGROUND OF THE INVENTION

Field of the Invention

The present invention relates to a charging system using a motor driving system and, more particularly, to a charging system using a motor driving system, which is configured for stably controlling an external charging voltage input to a neutral point of a motor, reducing current imbalance and improving charging efficiency.

Description of Related Art

In general, electric vehicles or plug-in hybrid electric vehicles perform battery charging, by converting power received from external charging equipment into a state suitable for battery charging and supplying power to a battery.

For example, conventional charging equipment for rapid charging was manufactured to output a voltage of 400 V. However, a battery used in a vehicle has been designed to have a voltage of 800 V or more to improve efficiency and increase a travelable distance. Accordingly, since rapid charging equipment still supplies a charging voltage of 400V but the battery used in the vehicle has a voltage of 800 V or more, a booster converter for boosting a voltage supplied by external charging equipment is required to charge the battery.

However, since a high-capacity booster converter for boosting a voltage of 400 V to 800 V or more has a large weight and volume and is expensive, it may be difficult to provide the high-capacity booster converter in a vehicle. Furthermore, the price of a vehicle may increase.

Generally, there is a demand for new charging technology for receiving the voltage of conventional charging equipment for providing a relatively low charging voltage, boosting the voltage to a high voltage without additionally providing an additional apparatus or further increasing cost and supplying the high voltage to a battery.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a charging system using a motor driving system, which is configured for boosting an external charging voltage using the motor driving system provided to drive a motor and converting the external charging voltage into a voltage suitable for charging a battery.

Various aspects of the present invention are directed to providing a charging system using a motor driving system, which is configured for stably controlling an external charging voltage input to a neutral point of a motor, reducing current imbalance of each phase and improving charging efficiency of a battery.

In accordance with an aspect of the present invention, the above and other objects may be accomplished by a charging system using a motor driving system having a battery, an inverter configured to receive and convert DC power stored in the battery into three-phase AC power and to output the three-phase AC power to a motor when the motor is driven, and the motor configured to generate rotation force using the three-phase AC power output from the inverter, including a controller configured to control the inverter to boost a voltage of a neutral point of the motor and to output the boosted voltage to the battery, by determining duty values of switching elements in the inverter when external charging current is provided to the neutral point of the motor.

The controller may include a voltage controller configured to determine a first duty value of the switching elements in the inverter based on a ratio of a preset target value of the voltage of the neutral point to a DC link voltage of the inverter and a difference between the target value of the voltage of the neutral point and a measured value of the voltage of the neutral point.

The voltage controller may include a divider configured to determine the ratio of the target value of the voltage of the neutral point to the DC link voltage of the inverter, a subtractor configured to determine a difference between the target value of the voltage of the neutral point and the measured value of the voltage of the neutral point, a control unit configured to generate a duty value for allowing the value determined by the subtractor to converge upon 0, and an adder configured to sum the value determined by the divider and output of the control unit to generate the first duty value.

The controller may include a nonlinearity compensator configured to generate a nonlinearity compensation duty value for compensating for nonlinearity of the inverter based on a detected value of the DC link voltage of the inverter and a detected value of the external charging current and an adder configured to sum the first duty value and the nonlinearity compensation duty value to generate a second duty value.

The controller may further include a current imbalance reduction controller configured to correct the second duty value such that a difference between an average value of detected values of currents flowing through coils of a plurality of phases in the motor and each of the detected values of the currents flowing through the coils of the plurality of phases converges upon 0 to generate individual duty values of the switching elements connected to the coils of the plurality of phases.

The current imbalance reduction controller may include a plurality of subtractors configured to determine the difference between the average value of the detected values of currents flowing through the coils of the plurality of phases in the motor and each of the detected values of the currents flowing through the coils of the plurality of phases, a plurality of control units configured to respectively generate duty values for allowing the values determined by the plurality of subtractors to converge upon 0, and a plurality of adders configured to add each of the duty values generated by the plurality of control units to the second duty value to generate the individual duty values of the switching elements in the inverter connected to the coils of the plurality of phases.

The current imbalance reduction controller may include a plurality of subtractors configured to determine the difference between the average value of the detected values of currents flowing through the coils of the plurality of phases in the motor and each of the currents flowing through the coils of the remaining phases except one of the plurality of phases, a plurality of control units configured to generate duty values for allowing the values determined by the plurality of subtractors to converge upon 0, a first adder configured to change a sign of the duty values generated by the plurality of control units and to sum the duty values, the sign of which has been changed, and a plurality of second adders configured to add each of the duty values generated by the plurality of control units and the duty values summed by the first adder to the second duty value to generate individual duty values of the switching elements in the inverter connected to the coils of the plurality of phases.

The controller may further include a signal output unit configured to generate and output switching element driving signals corresponding to the individual duty values for driving the switching elements.

The signal output unit may generate the switching element driving signals such that the switching elements respectively connected to the coils of the phases of the motor are interleaved-switched.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
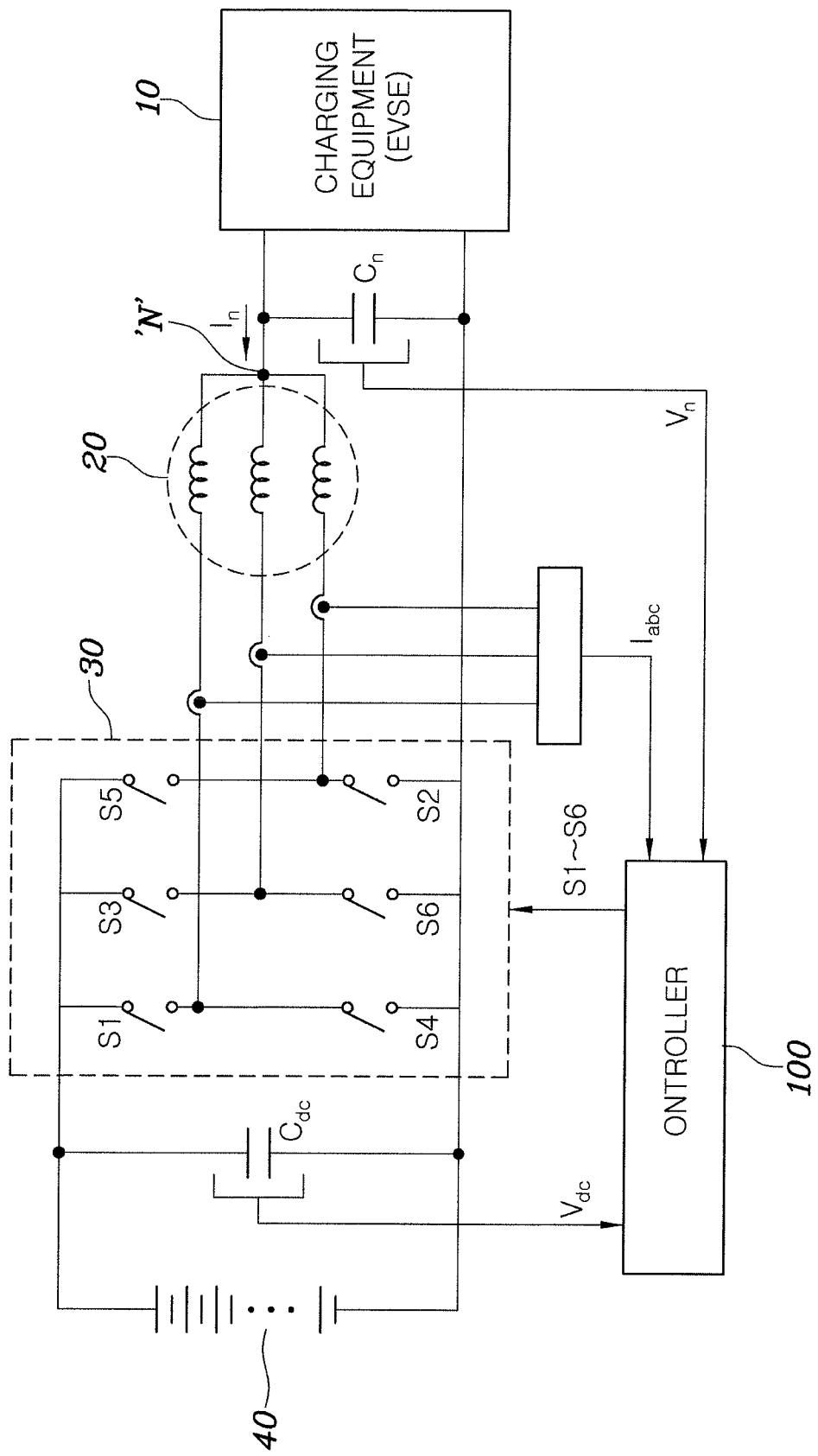
FIG. 1 is a circuit diagram of a charging system using a motor driving system according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a charging system using a motor driving system according to various embodiments will be described with reference to the accompanying drawings.

FIG. 1 is a circuit diagram of a charging system using a motor driving system according to an exemplary embodiment of the present invention.

Referring to FIG. 1, the charging system according to the exemplary embodiment of the present invention charges a battery 40, which is an energy storage device, through a system provided to drive a motor 20.

In general, the system for driving the motor 20 may include the battery 40 which is the energy storage device configured for storing power for driving the motor 20 and an inverter 30 for converting DC power stored in the battery 40 into three-phase AC power and providing the three-phase AC power to the motor 20. The inverter 30 has three legs connected to both ends of the battery 40 in parallel, two switching elements (two of S1 to S6) are connected in series in each of the legs L1 to L3, and driving power of one phase is provided from a connection node between two switching elements to the motor 20. Energy for driving the motor 20 flows from the battery 40 of FIG. 1 to the motor 20.

Accordingly, one of three-phase coils of the motor 20 and the switching elements S1 to S6 in one of the legs L1 to L3 of the inverter 30 connected thereto may configure one booster circuit. In other words, a total of three booster circuits is connected in parallel between the neutral point N of the motor 20 and the battery 20, by the three-phase motor and the three-phase inverter.

In various embodiments of the present invention, unlike the above-described flow of the energy for driving the motor, external charging power provided from electric vehicle supply equipment (EVSE) 10 to the neutral point N of the motor 20 is provided to the leg corresponding to each phase of the inverter 30, and the switching elements of each leg is controlled, boosted and provided to the battery 40, charging the battery 40.

That is, in various embodiments of the present invention, the connection terminal of the inverter 30 on the side of the motor 20 is the input terminal of the inverter 30 and the connection terminal of the inverter 30 on the side of the battery 40 is the output terminal of the inverter 30.

The charging system using the motor driving system according to an exemplary embodiment of the present invention may include the battery 40, the inverter 30 for receiving and converting DC power stored in the battery 40 into three-phase AC power and outputting the three-phase AC power to the motor 20 when the motor is driven, and the motor 20 for generating rotation force using the three-phase AC power output from the inverter 30. The charging system may further include a controller 100 for controlling the inverter 30 to determine the duty values of the switching elements in the inverter 30, to boost the voltage of the neutral point of the motor 20 and to output the boosted voltage to the battery 40, when external charging current is provided to the neutral point of the motor 20.

When charging current is received through the neutral point of the motor 20 to charge the battery 40, it is important to stably control the voltage Vn of the neutral point of the motor. If the voltage of the input terminal is not controlled as desired, charging is stopped or the system may be damaged.

Since the EVSE 10 may operate in a current control mode and a voltage control mode, the EVSE 10 may control the voltage Vn of the neutral point of the motor 20 which is the input terminal of charging power. However, in general vehicle charging, since the EVSE 10 mainly operates in the current control mode, in various embodiments of the present invention, the controller 100 controls the voltage Vn of the neutral point and the EVSE 10 performs current control.

Furthermore, when charging current is received through the neutral point of the motor 20 to charge the battery 40, it is important to control current in a balance state. Since current flowing into the motor is in a three-phase imbalance state due to motor imbalance or inverter imbalance, currents provided by the booster circuits respectively configured by the legs L1 to L3 of the inverter 30 and the coils (inductors) of the motor 20 may be the same. If current is not in a three-phase balance state, torque occurs and vehicle may move or vibrate if the motor is a vehicle driving motor. To prevent the present phenomenon, current imbalance reduction control is necessary.

Furthermore, when charging current is received through the neutral point of the motor 20 to charge the battery 40, it is important to maximize efficiency of the charging system. If efficiency of the charging system is low, electrical efficiency is low and heat is generated, causing problems in the cooling system. Furthermore, since durability of the motor or the inverter is adversely affected, it is important to increase efficiency of the charging system.

In consideration of these points, the controller 100 of the motor driving system according to various embodiments of the present invention may constantly control the voltage Vn of the neutral point N of the motor 20 and perform control to remove imbalance of current flowing through a path corresponding to each phase of the motor 20 or the inverter 30 during boosting operation. Furthermore, the controller 100 may perform control to improve charging efficiency.

Figure 2:
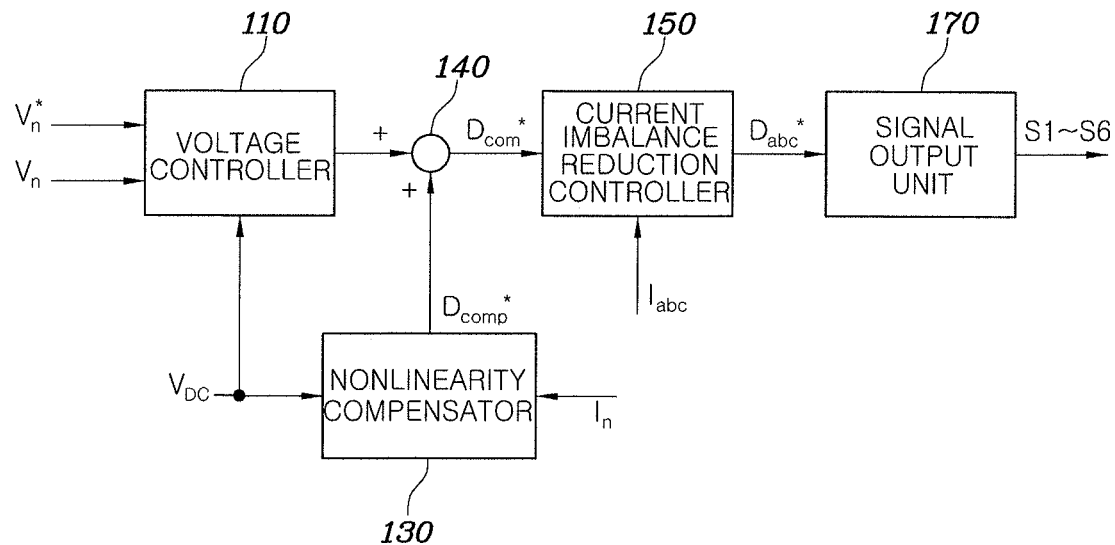
FIG. 2 is a block diagram showing an example of a controller of a charging system using a motor driving system according to an exemplary embodiment of the present invention in detail.

FIG. 2 is a block diagram showing an example of a controller of a charging system using a motor driving system according to an exemplary embodiment of the present invention in detail.

Referring to FIG. 2, the controller 100 of the motor driving system according to an exemplary embodiment of the present invention may include a voltage controller 110 for determining the duty values of the switching elements S1 to S6 based on a ratio of a target value Vn* of the voltage of the neutral point to a DC link voltage $V_{DC}$ of the inverter 30 and a difference between the target value Vn* of the voltage of the neutral point and a measured value Vn of the voltage of the neutral point.

Figure 3:
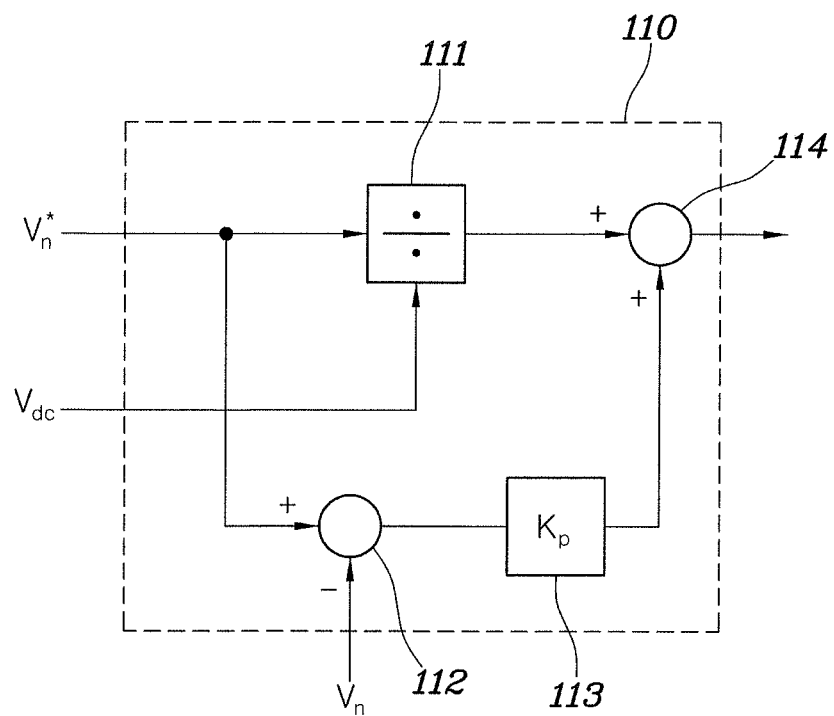
FIG. 3 is a diagram showing a voltage controller in the controller shown in FIG. 2 in greater detail.

FIG. 3 is a diagram showing a voltage controller in the controller shown in FIG. 2 in greater detail.

Referring to FIG. 3, the voltage controller 110 may include a divider 111 for determining the ratio of the target value Vn* of the voltage of the neutral point to the DC link voltage $V_{DC}$ of the inverter 30, a subtractor 112 for determining the difference between the target value Vn* of the voltage of the neutral point and the measured value Vn of the voltage of the neutral point, a control unit 113 for generating a duty value for allowing the value determined by the subtractor 112 to converge upon 0, and an adder 114 for adding the value determined by the divider 111 and the output of the control unit 113.

The ratio of the target value Vn* of the voltage of the neutral point to the DC link voltage $V_{DC}$ of the inverter 30 indicates the boosting ratio of the booster circuit formed by the coils of the motor 20 and the switching elements S1 to S6 of the inverter 30, and the result of the divider 111 may be the boosting ratios of the booster circuits, that is, the duty values of the switching elements.

In an exemplary embodiment of the present invention, a first duty value is determined by adding a component for performing control such that the voltage Vn of the neutral point becomes the preset target value Vn* to the duty value determined by the ratio of the target value Vn* of the voltage of the neutral point to the DC link voltage $V_{DC}$ of the inverter 30.

As shown in FIG. 3, the voltage controller 110 determines the difference between the target value Vn* of the voltage of the neutral point and the measured value Vn of the voltage of the neutral point through the subtractor 112, inputs the difference between the target value Vn* of the voltage of the neutral point and the measured value Vn of the voltage of the neutral point to the control unit 113 for generating the duty value for allowing the difference to converge upon 0, and generates the duty value for allowing the difference between the target value Vn* of the voltage of the neutral point and the measured value Vn of the voltage of the neutral point to become 0.

Although an example of applying a proportional controller (P controller) is shown in FIG. 3 to simplify the circuit and to rapidly perform control, a proportional integral controller (PI controller) or a proportional integral differential (PID) controller, which is well-known in the art, is selectively applicable.

The voltage controller 110 generates the first duty value by adding the duty value output from the control unit 113 to the duty value determined by the ratio of the target value Vn* of the voltage of the neutral point to the DC link voltage $V_{DC}$ of the inverter 30. The first duty value is obtained by adding, to the duty values of the switching elements S1 to S6 for boosting the booster circuit, the duty value for performing control such that the voltage Vn of the neutral point of the motor 20 for receiving external charging current from the EVSE 10 becomes the preset target value Vn* of the voltage of the neutral point.

When on/off of the switching elements S1 to S6 of the inverter 30 is controlled using the first duty value, the booster circuit may be controlled such that the level of the voltage Vn of the neutral point is boosted to the level of the DC link voltage $V_{DC}$ of the inverter 30 while the voltage Vn of the neutral point of the motor 20 follows the preset target value Vn* of the voltage of the neutral point.

Referring to FIG. 2 again, the exemplary embodiment of the present invention may further include a nonlinear compensator 130 for generating a compensation duty value Dcomp* for compensating for nonlinearity of the inverter 30 in the first duty value output from the voltage controller 110.

Here, nonlinearity of the inverter 30 means a difference between input and output caused due to dead times of the switching elements, an on/off delay time of an inverter driving circuit and characteristics of the switching elements for safe driving of the inverter. Due to nonlinearity, a duty value and inverter voltage determined by a control algorithm may be different from an actually output duty value and inverter voltage. Since such nonlinearity may cause control errors, dynamic characteristic reduction, etc., compensation is necessary.

To compensate for nonlinearity of the inverter 30, the nonlinearity compensator 130 may include a data map in which a nonlinearity compensation duty value Dcomp* corresponding to the DC link voltage $V_{DC}$ of the inverter 30 and external charging current In received from the EVSE 10 is stored in advance. That is, the nonlinearity compensator 130 may receive the detected value of the DC link voltage $V_{DC}$ of the inverter 30 and the detected value of the external charging current In received from the EVSE 10, and output the nonlinearity compensation duty value Dcomp* corresponding to the detected value of the DC link voltage $V_{DC}$ of the inverter 30 and the detected value of the external charging current In received from the EVSE 10, which is received from the data map.

The adder 140 may generate a second duty value Dcom* by adding the nonlinearity compensation duty value Dcomp* output from the nonlinearity compensator 130 to the first duty value output from the voltage controller 110. Here, the second duty value Dcom* is commonly applied to the booster circuit corresponding to each phase of the motor 20 and the inverter 30.

When on/off of the switching elements S1 to S6 of the inverter 30 is controlled using the second duty value, the booster circuit may be controlled such that the level of the voltage Vn of the neutral point is boosted to the level of the DC link voltage $V_{DC}$ of the inverter 30 while the voltage Vn of the neutral point of the motor 20 follows the preset target value Vn* of the voltage of the neutral point, and the booster circuit may be controlled to compensate for nonlinearity of the inverter 20.

The second duty value is commonly applied to the plurality of booster circuits corresponding to the phases of the motor 20 or the inverter 30. That is, in FIG. 1, one of the legs L1 to L3 of the inverter 30 is connected to the coil of one phase of the motor 20, and the coil of one phase and one leg form one booster circuit. The second duty value is commonly applied to the switching elements of the leg configuring each booster circuit. As described above, in the booster circuit corresponding to each phase, the motor 20 and the inverter 30 may have imbalance, control for removing imbalance is necessary. Therefore, the exemplary embodiment of the present invention includes a current imbalance reduction controller 150 shown in FIG. 2.

Figure 4:
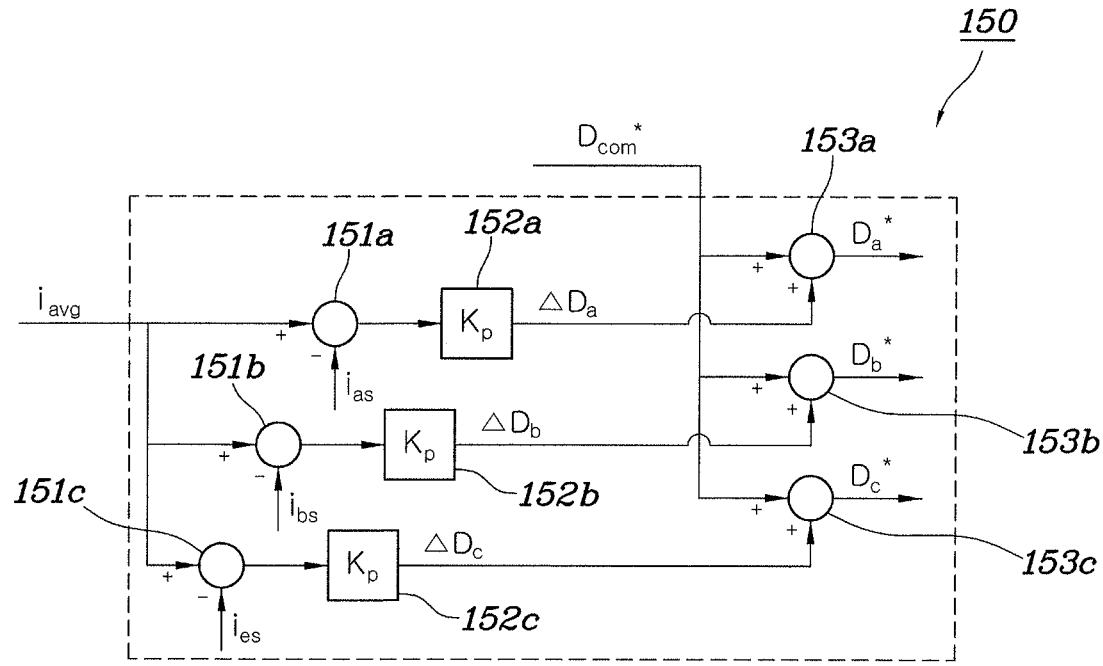
FIG. 4 and FIG. 5 are diagrams showing examples of a current imbalance reduction controller in the controller shown in FIG. 2.
Figure 5:
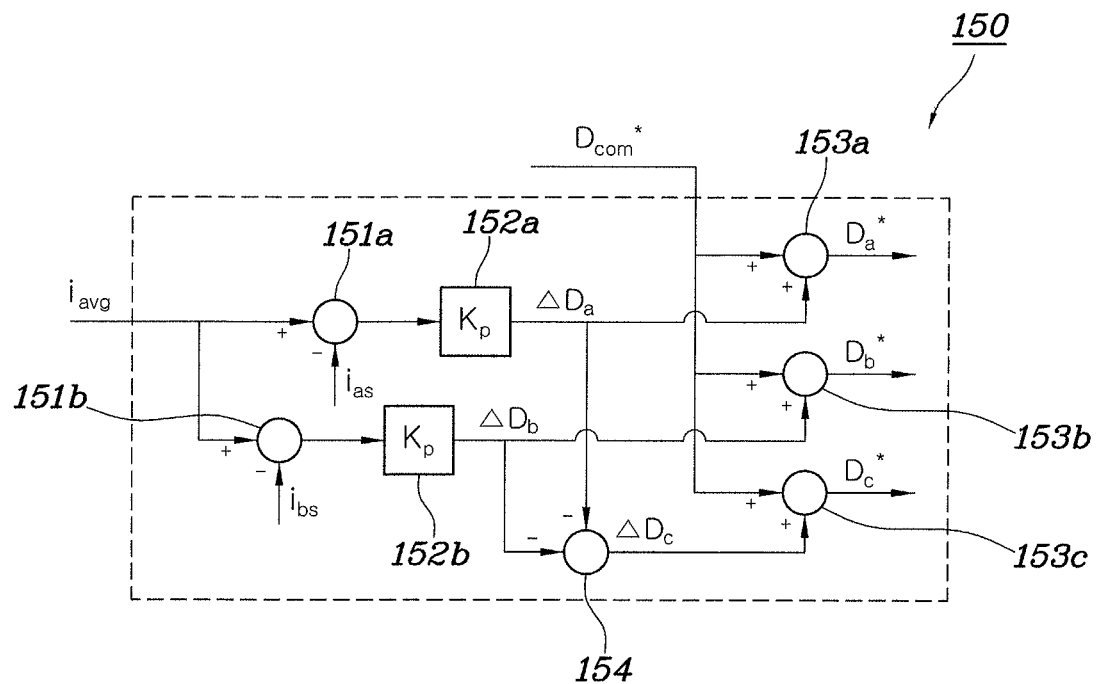

FIG. 4 and FIG. 5 are diagrams showing examples of a current imbalance reduction controller in the controller shown in FIG. 2.

First referring to FIG. 4, the current imbalance reduction controller 150 may include a plurality of subtractors 151a, 151b and 151c for determining differences between an average value $i_{avg}$ of the detected values $i_{as}$, $i_{bs}$ and $i_{cs}$ of current flowing through the coils of the plurality of phases of the motor 20 and the detected values $i_{as}$, $i_{bs}$ and $i_{cs}$ of current flowing through the coils of the plurality of phases, a plurality of control units 152a, 152b and 152c for generating the duty values ΔDa, ΔDb and ΔDc for allowing the determined values of the plurality of subtractors 151a, 151b and 151c to converge upon 0, and a plurality of adders 153a, 153b and 153c for generating the duty values Da*, Db* and Dc* of the switching elements in the inverter 30 connected to the coils of the plurality of phases by adding the duty values ΔDa, ΔDb and ΔDc generated by the plurality of control units 152a, 152b and 152c to the second duty value Dcom*.

In the above configuration, the plurality of control units 152a, 152b and 152c performs control such that currents $i_{as}$, $i_{bs}$ and $i_{cs}$ flowing through the coils of the phases of the motor 20 follow the average value $i_{avg}$ thereof. The current having the same level flow in the plurality of booster circuits including the coils of the phases of the motor 20, solving imbalance of the motor 20 or the inverter 30. Therefore, it is possible to suppress occurrence of torque of the motor 20 to solve risk of moving or vibrating the vehicle during charging.

Referring to FIG. 5, another example of the current imbalance reduction controller 150 may include a plurality of subtractors 151a and 151b for determining differences between an average value $i_{avg}$ of the detected values $i_{as}$, $i_{bs}$ and $i_{cs}$ of current flowing through the coils of the plurality of phases of the motor 20 and the detected values $i_{as}$ and $i_{bs}$ of currents flowing through the coils of the remaining phases except one of the plurality of phases, a plurality of control units 152a and 152b for generating the duty values ΔDa and ΔDb for allowing the determined values of the plurality of subtractors 151a and 151b to converge upon 0, a first adder 154 for changing the sign of the duty values ΔDa and ΔDb generated by the plurality of control units 152a and 152 and summing the duty values, the sign of which has been changed, and a plurality of second adders 153a, 153b and 153c for generating the duty values Da*, Db* and Dc* of the switching elements in the inverter 30 connected to the coils of the plurality of phases by adding the duty values ΔDa and ΔDb generated by the plurality of control units 152a and 152b and the duty value −ΔDa−ΔDb summed by the adder 154 to the second duty value Dcom*.

In the example shown in FIG. 5, the duty control value of the switching elements of the booster circuit including the coil of one of the plurality of phases is not generated. This is because the output voltage may be controlled as desired without affecting the second duty value Dcom* which is the common duty value when the sum of the individual duty values of the switching elements of each booster circuit becomes 0.

Although an example of applying a proportional controller (P controller) is shown in FIG. 4 and FIG. 5 to simplify the circuit and to rapidly perform control, a proportional integral controller (PI controller) or a proportional integral differential (PID) controller, which is well-known in the art, is selectively applicable.

Referring to FIG. 2 again, the controller 100 may further include a signal output unit 170 for generating and outputting a switching element driving signal corresponding to the individual duty value Dabc* for individually controlling the switching elements of the booster circuit corresponding to each phase of the motor 20.

Since the charging system according to various embodiments of the present invention performs boosting charging control using the motor 20, charging efficiency is lowered as compared to a charging system which does not perform boosting charging. At the instant time, loss occurring during charging occurs in the inverter 30 for performing switching and the motor 20 through which current flows.

Loss occurring in the motor 20 includes iron loss and copper loss. Since copper loss is proportional to the amount of current, it is impossible to reduce copper loss. Since iron loss is highly related to the magnitude and frequency of current ripple, there is a demand for a method of reducing current ripple.

Figure 6:
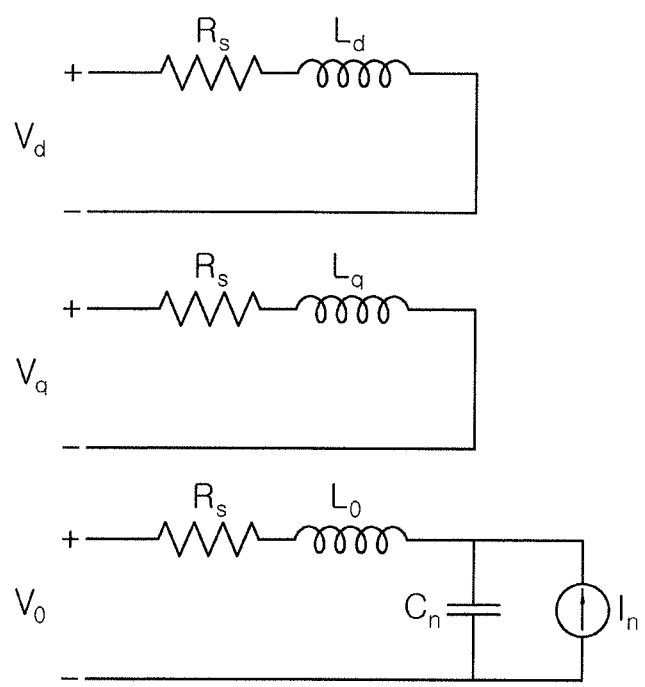
FIG. 6 is a diagram showing dq0 model of a motor.
Figure 7:
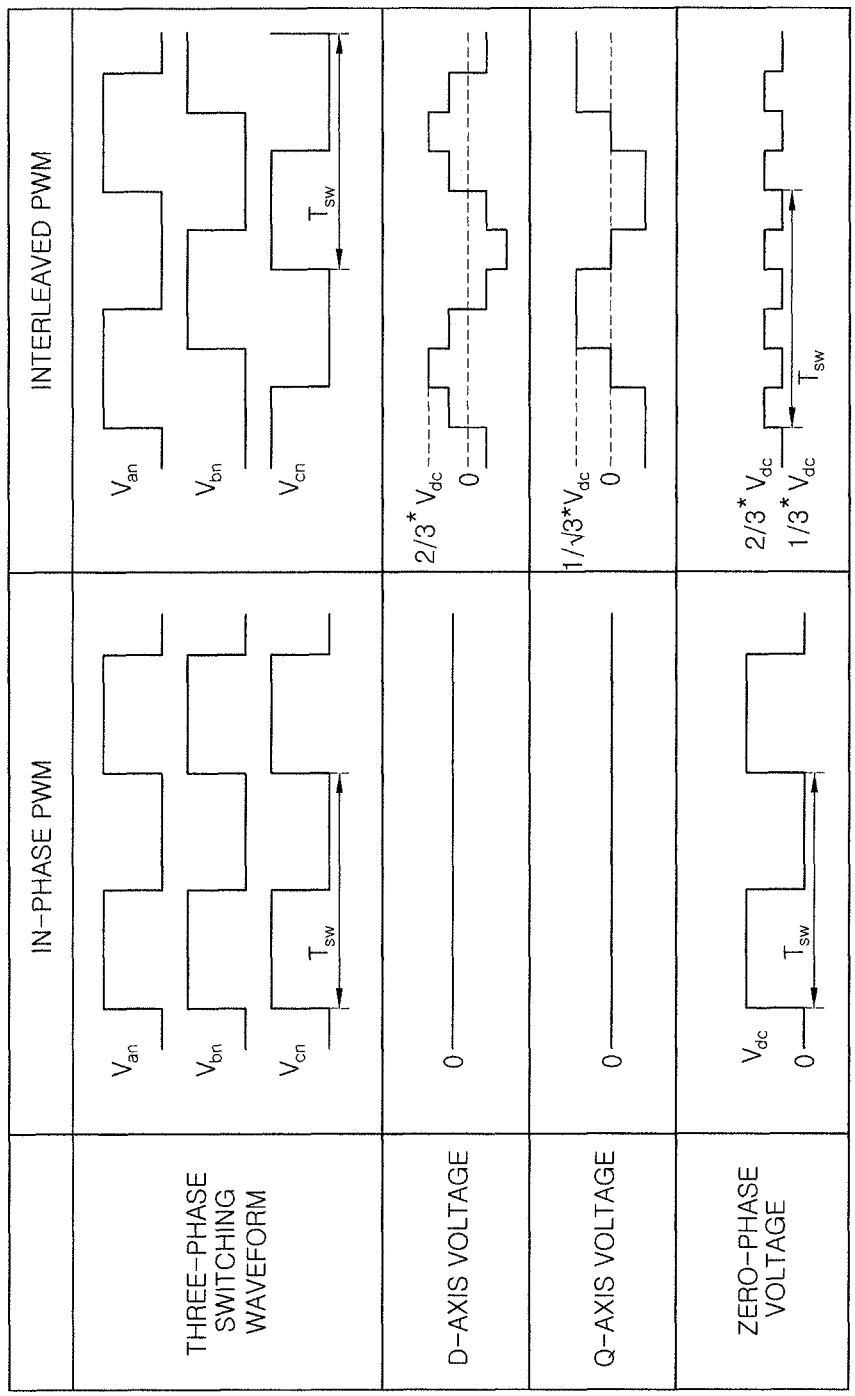
FIG. 7 is a diagram showing comparison between in-phase switching control and interleaved switching control of a switching element of a booster circuit corresponding to each phase of a motor or an inverter.

FIG. 6 is a diagram showing dq0 model of a motor, and FIG. 7 is a diagram showing comparison between in-phase switching control and interleaved switching control of a switching element of a booster circuit corresponding to each phase of a motor or an inverter.

Referring to FIG. 6 and FIG. 7, in the case of in-phase switching, dq-axis voltage ripple is not generated, but zero-phase voltage ripple with the same frequency as a switching frequency is generated and the magnitude thereof is as large as Vdc. However, in the case of interleaved switching, dq-axis voltage ripple is generated but the frequency of zero-phase switching ripple is three times that of in-phase switching and the magnitude thereof is as small as Vdc/3.

Since the magnitude of current ripple is generally inversely proportional to the frequency and is proportional to the level of the voltage, the magnitude of zero-phase current ripple in interleaved switching is ⅑ that of in-phase switching.

If the interleaved switching method is used, the dq-axis voltage pulsates. However, in general, since dq-axis inductance is greater than zero-phase inductance, the magnitude of phase-current ripple does not significantly increase. Furthermore, since only zero-phase current flows through the capacitor Cn, the dq-axis voltage and current ripple do not affect the size of the capacitor.

Accordingly, in an exemplary embodiment of the present invention, the signal output unit 170 may generate the switching element driving signal such that the switching elements of the booster circuits corresponding to the phases of the motor 20 or the inverter 30, that is, the switching elements connected to the coils of the phases of the motor 20, are interleaved-switched, minimizing loss due to boosting and improving efficiency.

According to the charging system using the motor driving system, it is possible to charge the battery without adding a separate booster converter when the voltage of the battery is higher than the voltage supplied by the external charging equipment.

According to the charging system using the motor driving system, it is possible to stably control the voltage of the neutral point of the motor to prevent the system from being damaged when the external charging equipment provides charging current to the neutral point of the motor through current control.

Furthermore, according to the charging system using the motor driving system, it is possible to prevent torque from occurring in the motor during charging and prevent the motor driving apparatus, such as the vehicle, from moving or vibrating, by reducing current imbalance of each phase.

According to the charging system using the motor driving system, it is possible to improve charging efficiency of the battery through interleaved switching control of the coil of each phase of the motor and the plurality of booster circuits implemented by the switching elements of the inverter connected thereto.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A charging system using a motor driving system, the motor driving system comprising: a battery and an inverter, the inverter configured to receive and convert a direct current (DC) power stored in the battery into a three-phase alternating current (AC) power and to output the three-phase AC power to a motor when the motor is driven, and the motor configured to generate a rotation force using the three-phase AC power output from the inverter; the charging system comprising:
   a controller configured to control the inverter to boost a voltage at a neutral point of the motor and to output the boosted voltage to the battery by determining duty values of switching elements in the inverter, when an external charging current is provided to the neutral point of the motor.

2. The charging system according to claim 1,
   wherein the controller includes a voltage controller configured to determine a first duty value of the switching elements in the inverter based on a ratio of a preset target value of the voltage of the neutral point to a DC link voltage of the inverter and a difference between the preset target value of the voltage of the neutral point and a measured value of the voltage of the neutral point.

3. The charging system according to claim 2, wherein the voltage
   controller includes:
   a divider configured to determine the ratio of the preset target value of the voltage of the neutral point to the DC link voltage of the inverter to output a first value;
   a subtractor configured to determine the difference between the preset target value of the voltage of the neutral point and the measured value of the voltage of the neutral point to output a second value;
   a control unit configured to generate a duty value for allowing the second value output by the subtractor to converge upon 0; and
   an adder configured to sum the first value determined by the divider and an output of the control unit to generate the first duty value.

4. The charging system according to claim 2, wherein the controller further includes:
   a nonlinearity compensator configured to generate a nonlinearity compensation duty value for compensating for nonlinearity of the inverter based on a detected value of the DC link voltage of the inverter and a detected value of the external charging current; and
   an adder configured to sum the first duty value and the nonlinearity compensation duty value to generate a second duty value.

5. The charging system according to claim 4,
   wherein the controller further includes a current imbalance reduction controller configured to correct the second duty value such that a difference between an average value of detected values of currents flowing through coils of a plurality of phases in the motor and each of the detected values of the currents flowing through the coils of the plurality of phases converges upon 0 to generate individual duty values of the switching elements connected to the coils of the plurality of phases.

6. The charging system according to claim 5, wherein the current imbalance reduction controller includes:
- a plurality of subtractors configured to determine the difference between the average value of the detected values of the currents flowing through the coils of the plurality of phases in the motor and each of the detected values of the currents flowing through the coils of the plurality of phases;
- a plurality of control units configured to respectively generate duty values for allowing values determined by the plurality of subtractors to converge upon 0; and
- a plurality of adders configured to add each of the duty values generated by the plurality of control units to the second duty value to generate the individual duty values of the switching elements in the inverter connected to the coils of the plurality of phases.

7. The charging system according to claim 5, wherein the current imbalance reduction controller includes:
- a plurality of subtractors configured to determine the difference between the average value of the detected values of the currents flowing through the coils of the plurality of phases in the motor and each of the currents flowing through the coils of a remaining phases except one of the plurality of phases;
- a plurality of control units configured to generate duty values for allowing values determined by the plurality of subtractors to converge upon 0;
- a first adder configured to change a sign of the duty values generated by the plurality of control units and to sum the duty values, the sign of which has been changed; and
- a plurality of second adders configured to add each of the duty values generated by the plurality of control units and the duty values summed by the first adder to the second duty value to generate the individual duty values of the switching elements in the inverter connected to the coils of the plurality of phases.

8. The charging system according to claim 5, wherein the controller further includes a signal output unit configured to generate and output switching element driving signals corresponding to the individual duty values for driving the switching elements.

9. The charging system according to claim 8, wherein the signal output unit generates the switching element driving signals such that the switching elements respectively connected to the coils of the plurality of phases in the motor are interleaved-switched.

* * * * *